United States Patent Office 3,527,823
Patented Sept. 8, 1970

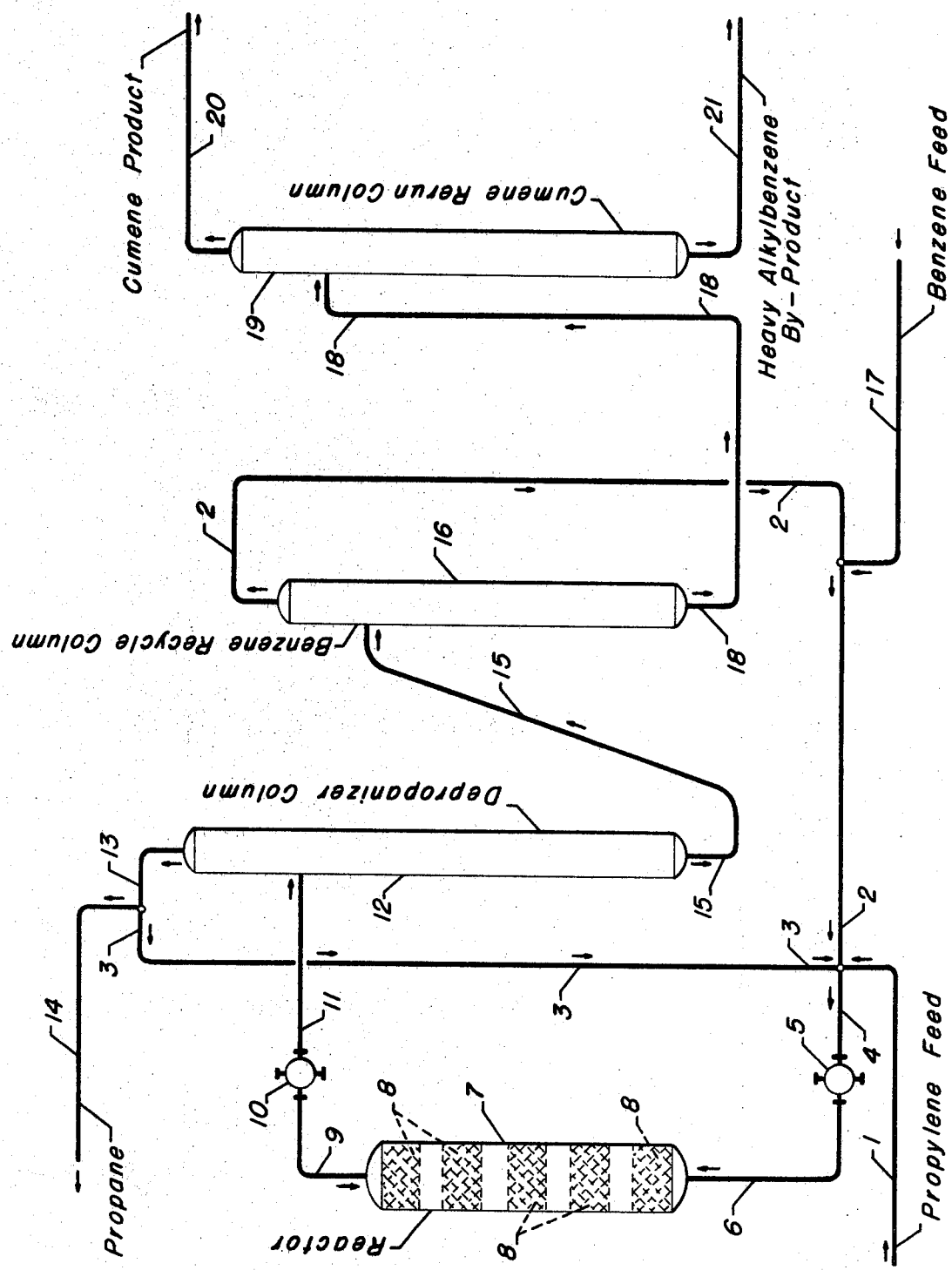

3,527,823
PROCESS FOR ALKYLATION OF AROMATIC COMPOUNDS
Edwin K. Jones, Kenilworth, Ill., assignor to Universal Oil Products Company, Des Plaines, Ill., a corporation of Delaware
Continuation-in-part of application Ser. No. 635,988, May 4, 1967. This application July 16, 1969, Ser. No. 842,224
Int. Cl. C07c 3/54
U.S. Cl. 260—671                  13 Claims

ABSTRACT OF THE DISCLOSURE

A process for the synthesis of monoalkylated aromatic compound which comprises passing an alkylatable aromatic compound and an olefin-acting alkylating agent upflow through a reaction zone under alkylating conditions in the presence of an unreactive vapor dispersant. The molar ratio of olefin-acting alkylating agent to unreactive vapor dispersant is preferably not greater than 2:1. The process is particularly applicable to the synthesis of cumene from benzene and propylene in the presence of a solid phosphoric acid catalyst.

CROSS-REFERENCE TO RELATED APPLICATION

This application is a continuation-in-part of my copending application Ser. No. 635,988 filed on May 4, 1967, now abandoned.

FIELD OF INVENTION

The present invention relates to the alkylation of an alkylatable aromatic compound with an olefin-acting alkylating agent. More specifically, the present invention relates to the alkylation of an aromatic hydrocarbon with an olefinic hydrocarbon. Most particularly, the present invention relates to an improved process for alkylation of benzene with propylene to produce cumene.

The present invention finds broad application in the production of alkylated aromatic hydrocarbons for use in subsequent chemical synthesis. The present invention particularly finds application in the production of isopropylbenzene, or cumene, which is utilized in the synthesis of phenol, acetone, alpha-methylstyrene, and acetophenone. These cumene-derived chemicals are intermediates in the synthesis of resins for plastics and nylon. A further application of the inventive process may be found in the synthesis of p-cymene which may be oxidized to produce p-cresol.

A further broad application of the inventive process may also be found in the alkylation of substituted aromatics such as phenol, which when alkylated with isobutylenes forms O-tertiary-butylphenol which is an intermediate in the synthesis of other chemicals, and form p-tertiarybutylphenol which is used to modify phenol-formaldehyde resins. A further application of the inventive process upon substituted aromatic hydrocarbons may be found in the alkylation of para-hydroxyanisole with tertiary butyl alcohol or isobutylene to form butylated hydroxyanisole which finds utility as an antioxidant in the preservation of foods.

DESCRIPTION OF THE PRIOR ART

As indicated above, the present invention particularly relates to the synthesis of isopropylbenzene, or cumene. In the commercial manufacturing of cumene it is the art to charge liquid benzene and liquid propylene into a reactor containing a plurality of stationary or fixed beds of solid phosphoric acid catalyst. It is further the art to charge the benzene and propylene downflow through the reaction zone. Since it is desired to minimize the dialkylation of benzene it is the art to have a molar excess of benzene, and normally the ratio of benzene to propylene is about 8:1. At normal reaction conditions of temperature and pressure, a substantial portion of the liquid propylene will flash to the vapor state but the benzene will substantially remain liquid.

It has now been determined that liquid benzene tends to channel down through the fixed catalyst beds in the prior art downflow process, and it is believed that this channeling stems from two causes. First, the influence of gravity is more pronounced upon the liquid than the vapor and tends to draw circulation of liquid benzene downward while there is greater freedom for the vapor to back-flow upwardly in eddy currents within the reactor. Secondly, the liquid benzene will follow the wetted surfaces of the catalyst, and there is a pronounced resistance for the liquid to spread out horizontally to otherwise liquid free catalyst surfaces. Since the liquid benzene is channeling down through the reactor, propylene vapor tends to accumulate in pockets at the top of the reactor vessel or to channel without contacting liquid benzene even though there is a molar excess of benzene present in the reactor. Therefore, some propylene does not react with liquid benzene and thereby oligomerizes on the catalyst to produce propylene-dimer, propylene-trimer, or even heavier olefinic materials, all of which are undesirable.

Although the resulting product cumene will contain only small amounts of these olefinic contaminants (hexenes, nonenes, and dodecenes), these olefinic by-products must be removed from the product cumene. It is known that in the subsequent utilization of cumene for the synthesis of phenols, trace olefins act as rate depressants in the oxidation reaction. Since these olefins interfere with the production of high quality phenol from cumene it is necessary to minimize the quantity of olefin in the cumene product.

The olefin contamination of the product cumene may be removed by several methods. One prior art method is to remove the olefinic constituents by fractionation. A second and preferable method is to provide sufficient catalyst to alkylate the benzene in the reaction vessel with the contaminating olefins to produce heavy alkylbenzenes.

There are several disadvantages in attempting to remove olefins by fractionation of the cumene. First, it is difficult to remove nonene and heavier olefinic materials from the pure cumene and some cumene product must be lost with the olefin being removed. This cumene loss can be substantial in relation to the trace amount of olefin which must be removed. Another drawback to fractionation is that extensive recycling of fractions may be necessary in order to minimize cumene loss. It must also be noted that the required additional fractionation facilities are a burdensome capital expenditure.

It is therefore preferable to overcome the disadvantages of fractionation by merely providing enough catalyst in the alkylation reactor to enable the molar excess of benzene to be alkylated with the heavy olefin. This is accomplished by providing sufficient catalyst in the reactor so that the Liquid Hourly Space Velocity (LHSV) is less than 3.0 and is preferably 1.0 or less. The resulting heavy alkylbenzenes are then easily removed by fractionation from the cumene as a cumene bottoms fraction. However, this method of reacting out the olefin contaminants which would otherwise stay in the cumene product fraction, also has its disadvantages in that the resulting heavy alkylbenzene product constitutes a yield loss of not only the propylene which resulted in the heavy olefin, but also a yield loss of the benzene itself.

Attempts to minimize the yield loss of both propylene and benzene in the reaction zone by utilizing novel catalysts have not been entirely successful. Attempts to minimize these yield losse by modification of the reaction system also have not been particularly successful.

SUMMARY OF THE INVENTION

It is a broad objective of this invention to produce alkylated aromatic compounds and more particularly mono-alkylated aromatic compounds. It is a particular objective to produce mono-alkylated benzene hydrocarbons by the practice of an improved alkylation process. It is a specific objective of this invention to produce cumene in a more economical and facile manner.

In the process of the present invention, an inventive concept has been discovered whereby process improvements have been obtained in the synthesis of cumene by modifying operations to react benzene and propylene in an upflow reaction zone in the presence of an inert vapor dispersant. By operation in accordance with the practice of the present invention, product cumene of high purity is produced while minimizing loss of propylene and benzene to either olefinic or heavy alkylbenzene by-products. The present invention may also be applied to obtain similar processing benefits in the synthesis of other aromatic compounds, as will be set forth hereinafter.

In accordance with these objectives, the inventive process may be characterized as a process for the production of mono-alkylated aromatic compound from an alkylatable aromatic compound and an olefin-acting alkylating agent which comprises passing the alkylatable aromatic compound and the olefin-acting alkylating agent into the bottom of a fixed bed reaction zone in the presence of an unreactive vapor dispersant under conditions sufficient to alkylate the alkylatable aromatic compound with the olefin-acting alkylating agent; withdrawing from the top of the reaction zone an effluent stream comprising alkylatable aromatic compound, mono-alkylated aromatic compound, and unreactive vapor dispersant; and, recovering high-purity mono-alkylated aromatic compound from the effluent stream.

This broad embodiment and other more specific embodiments will be more clearly set forth hereinafter.

Many aromatic compounds are utilizable as alkylatable aromatic compounds within the process of this invention. The preferred aromatic compounds are aromatic hydrocarbons, but substituted aromatic hydrocarbons are equally suitable. Such aromatic compounds as phenol, cresol, and hydroxyanisole are among the substituted aromatic hydrocarbons which may be alkylated within the scope of this process.

The preferred aromatic hydrocarbons which may be alkylated within this invention are monocyclic aromatic hydrocarbons. These aromatic hydrocarbons include benzene, toluene, ortho-xylene, meta-xylene, para-xylene, ethylbenzene, orthoethyltoluene, normal propylbenzene, isopropylbenzene, n-butylbenzene, etc. Higher molecular weight alkylaromatic hydrocarbons are also suitable as reactants and include aromatic hydrocarbons such as hexylbenzene, nonylbenzene, dodecylbenzene, etc. Other suitable alkylatable aromatic hydrocarbons include those with two or more aryl groups such as diphenyl, diphenylmethane, triphenyl, triphenylmethane, fluorene, stilbene, and so forth. Examples of alkylatable aromatic hydrocarbons within the scope of this invention utilizable as reactants and containing condensed aromatic rings include naphthalene, alkyl-naphthalenes, anthracene, phenanthrene, naphthacene, etc.

Of the alkylatable aromatic hydrocarbons of use within the process of this invention the monocyclic aromatic hydrocarbons are preferred and benzene is particularly preferred.

The olefinic-acting compound or alkylating agent which may be processed within the inventive process may be selected from diverse materials including mono-olefins, di-olefins, polyolefins, acetylenic hydrocarbons, alcohols, ethers and esters. These esters include alkylhalides, alkylsulfates, alkylphosphates, and various esters of carboxylic acids.

The preferred olefin-acting compounds are olefinic hydrocarbons and particularly the mono-olefins. Mono-olefins which are utilized as olefin-acting compounds in the process of the present invention may be either normally gaseous or normally liquid at ambient temperature and may include ethylene, propylene 1-butenes, 2-butenes, isobutylene, and higher molecular weight normally liquid olefins such as various pentenes, hexenes, heptenes, etc. Cyclo-olefins such as cyclopentene, methyl-cyclopentene, cyclohexene, methyl-cyclohexene, etc. may also be utilized.

Also included within the scope of the olefin-acting compound are certain substances capable of producing olefinic hydrocarbons or intermediates thereof under the conditions of operation utilized in the process. Typical olefin producing substances or olefin-acting compounds capable of use include alkylhalides capable of undergoing dehydrohalogenation to form olefinic hydrocarbons. Examples of such alkylhalides include ethyl fluoride, ethyl chloride, ethyl bromide, ethyl iodide, n-propyl fluoride, n-propyl chloride, n-propyl bromide, n-propyl iodide, isopropyl fluoride, isopropyl chloride, isopropyl bromide, isopropyl iodide, and other halogen substituted homologs. As also stated hereinabove, other esters such as alkyl sulfates including ethyl sulfate, propyl sulfate, etc. and alkyl phosphates including ethyl phosphate, propyl phosphate, etc. may be utilized. Ethers such as diethyl ether, ethylpropyl ether, dipropyl ether, etc. are also included within the generally broad scope of the term "olefin-acting compound." In addition, alcohols such as isopropanol, iso-butanol, tertiary butyl alcohol, etc. may be successfully utilized as olefin-acting compounds in the process of this invention.

As previously noted, the preferred embodiment of this invention comprises the inventive process wherein the aromatic compound is benzene, the olefin-acting alkylating agent is propylene, and the desired mono-alkylated aromatic compound is high purity cumene. In addition, the preferred embodiment comprises the inventive process wherein cumene is synthesized by the mono-alkylation of benzene by propylene in the presence of a solid phosphoric acid catalyst and an unreactive vapor dispersant.

Accordingly, the preferred embodiment of the present invention may be more particularly characterized as a process for the production of cumene which comprises, passing benzene and propylene in an upflow manner through a substantially liquid full fixed bed reaction zone containing a solid phosphoric acid catalyst in the presence of an unreactive vapor dispersant; reacting the propylene with benzene in the reaction zone under conditions sufficient to monoalkylate benzene with propylene while substantially maintaining benzene in a liquid state and maintaining the dispersant in the vapor state; withdrawing from the reaction zone an effluent stream comprising benzene, cumene and unreactive vapor dispersant; and, recovering cumene from the effluent in high concentration.

As shall be set forth more clearly hereinafter, the present invention is found to give best results in cumene synthesis when the unreactive vapor dispersant is present in an amount sufficient to maintain the molar ratio of propylene to dispersant not greater than about 2:1. Since the propylene feed to a commercial cumene synthesis unit typically contains some propane in varying amounts, it is preferred to use propane as the dispersant in cumene synthesis, although other inert vapors may be used as the unreactive vapor dispersant. Thus, in order to maintain the desired mole ratio of propylene to unreactive vapor dispersant, the commercial cumene synthesis unit will recycle a sufficient amount of propane from the depropanizer column to maintain the mole ratio at the desired level.

A better understanding of the process of the present invention may now be obtained by referring to the accompanying drawing which comprises a simple schematic flow diagram of one preferred embodiment of the inventive process.

DESCRIPTION OF THE DRAWING

A propylene feed enters the process of the present invention via line 1. The propylene feed typically will contain a minor amount of propane. The propane portion of the typically available commercial propylene feed may range from about one percent to about 50%.

The propylene feed is mixed with a benzene liquid stream which enters the reaction zone via line 2 from a source to be disclosed hereinafter. The propylene feed is also mixed with a recycle propane fraction which enters the reaction zone of the present invention via line 3 from a source to be disclosed hereinafter. The mixture of benzene, propylene and propane passes via line 4 into a reactor preheater 5. Preheater 5 heats the reaction mixture to a reactor inlet temperature sufficient to promote the catalytic reaction within the reaction zone. The conditions of temperature and pressure are selected so that heating of the mixture will substantially vaporize all of the propane and propylene, while maintaining the benzene in a substantially liquid state.

The mixture of liquid benzene, vaporized propane and vaporized propylene passes from heat exchanger 5 into reactor vessel 7 via line 6. The reactor vessel 7 contains a plurality of catalyst beds 8 which contain a solid phosphoric acid catalyst. While the drawing discloses five fixed catalyst beds within the reactor vessel 7, any number may be utilized. The particularly preferred number is from 2 to 3 catalyst beds, although one or more may be utilized within the practice and scope of the present invention.

As the reaction mixture enters the bottom of reactor vessel 7, the liquid benzene passes upward through the catalyst beds, and maintains the solid phosphoric acid catalyst substantially immersed in liquid benzene. The vapor mixture of propylene and propane bubbles up through the liquid phase in a fine dispersion of vapor. The dispersion of vapor enables the propylene to be more efficiently reacted with the liquid benzene on the surface of the solid phosphoric acid catalyst to produce product cumene. Typical conditions within the reaction zone comprise a pressure of from about 300 p.s.i.g. to about 1000 p.s.i.g., and a temperature in the range of from about 300° F. to about 600° F.

The resulting mixture of liquid benzene, liquid cumene and propane vapor leaves reactor vessel 7 via line 9 and enters a cooler 10. The reactor effluent mixture is cooled therein to a temperature sufficient to allow entry of the effluent mixture into a depropanizer column 12 via line 11 at temperature substantially near bubble point of the effluent. The depropanizer column 12 is maintained under fractionation conditions sufficient to separate propane from benzene, cumene and heavy alkylbenzenes.

A net propane is withdrawn overhead from the depropanizer column 12 via line 13. This propane is separated into at least two portions. A first portion is withdrawn via line 14 as a net propane make which may be sent to a fuel gas header or to a liquified petroleum gas recovery unit. A second portion of the propane is withdrawn via line 3 and sent back to the reaction zone as the recycle propane stream which is required in order to maintain the recycle propane stream which is required in order to maintain the desired mole ratio between propylene and unreactive vapor dispersant.

A net liquid fraction is withdrawn from the bottom of depropanizer column 12 via line 15. This liquid fraction comprises benzene, cumene and heavy alkylbenzenes having substantial freedom from propane, and it is passed into a benzene recycle column 16 via line 15. Benzene recycle column 16 is operated under fractionation conditions sufficient to produce a substantially pure benzene while effecting a separation between cumene and benzene such that little or no benzene will remain in the cumene-rich bottoms fraction. The benzene is withdrawn from the top of benzene recycle column 16 via line 2 for return to the reaction zone in order to maintain the desired mole ratio between benzene and propylene. A benzene feed is introduced into the process of the present invention via line 17 and passes with the recycle benzene fraction into the reaction zone via line 2.

A liquid bottoms fraction is withdrawn from the bottom of benzene recycle column 16 via line 18. This fraction comprises cumene and heavy alkylbenzenes having substantial freedom from benzene and lighter constituents. The bottoms fraction is passed via line 18 into a cumene rerun column 19 which is maintained under fractionation conditions sufficient to separate a high purity cumene product from the heavy alkylbenzene by-product. The cumene product is withdrawn from the top of the cumene recycle column 19 via line 20 while the heavy alkylbenzene by-product fraction is withdrawn from the bottom of the cumene recycle column via line 21.

In the brief description of the drawing for the process of the present invention, those skilled in the art will realize that the process will contain pieces of equipment which are not disclosed in the drawing. For example, the fractionating columns will contain reboiler circuits and reflux circuits which are not shown in the drawing. In addition, various heat exchangers, pumps, instrumentation, etc. will be included in the inventive process, but for the sake of clarity have not been shown in the drawing.

In order to afford a better understanding of the effectiveness of the present invention, the following examples and tables of data are now presented. These examples and tables of data were obtained from commercial aromatics alkylation units and they comprise a condensation of commercial operating data.

EXAMPLE I

A cumene unit containing 98,400 lbs. of solid phosphoric acid catalyst in a fixed bed reactor containing five beds, was operated with a downflow charge of reactants in the standard prior art manner. The reactants consisted of 545 b.p.s.d. (barrels per stream day) of fresh benzene, 4,121 b.p.s.d. of benzene recycled from the fractionation section of the unit in order to maintain the desired 8:1 molar excess of benzene in the reaction zone, and 548 b.p.s.d. of liquified propylene-propane fresh feed. The propylene-propane fresh feed was 94.9 mole percent propylene and comprised 518 b.p.s.d. of propylene and 30 b.p.s.d. of propane. The total combine feed entered the reactor at 382° F. and 500 p.s.i.g. at the rate of 5,124 b.p.s.d. The effluent left the reactor at 442° F. and was sent to a depropanizer fractionation column wherein 30 b.p.s.d. of propane product was produced overhead and sent to the fuel gas line. The resulting depropanizer bottoms was sent to a benzene fractionation column wherein 4,121 b.p.s.d. of benzene was removed overhead and returned to the reactor as the recycle benzene stream. The benzene column bottoms was sent to a cumene fractionation column wherein 819 b.p.s.d. of cumene product was produced overhead and sent to product storage while 51 b.p.s.d. of cumene bottoms product (heavy alkylbenzenes) was removed to by-product storage. The cumene product had a Bromine Index of 390 and a cumene purity in excess of 99.8 mole percent. (Bromine Index is typically determined by ASTM Method D–1492–60 and is one method of analysis which is utilized in determining olefinic contamination of the cumene.)

EXAMPLE II

The cumene unit was charged downflow in the standard prior art manner at the rate of 5,474 b.p.s.d. of combined feed. The benzene charge was 4,420 b.p.s.d. comprising 529 b.p.s.d. of fresh benzene feed and 3,891 of benzene recycle. The propylene-propane feed was 50.1 mole percent propylene and comprised 509 b.p.s.d. of propylene and 545 b.p.s.d. of propane. The combined feed entered the reactor at 385° F. and 500 p.s.i.g. and the effluent left the reactor at 444° F. The effluent was fractionated to provide 545 b.p.s.d. of propane product, 3,891 b.p.s.d. of benzene which was recycled to the reactor, 792 b.p.s.d. of cumene product and 52 b.p.s.d. of cumene column bottoms (heavy alkylbenzene by-product). The cumene product had a purity in excess of 99.8 mole percent and a Bromine Index of 84.

EXAMPLE III

The cumene unit was charged downflow in the stand- and prior art manner at the rate of 6,011 b.p.s.d. of combined feed. The benzene charge was comprised of 535 b.p.s.d. of fresh benzene and 3,945 b.p.s.d. of recycle benzene. The liquid propylene-propane feed contained 35.2 mole percent of propylene and comprised 806 b.p.s.d. of propylene-propane fresh feed and 725 b.p.s.d. of propane which was recycled from the depropanizer column in order to reduce the concentration of propylene. The propylene-propane fresh feed comprised 511 b.p.s.d. of propylene and 295 b.p.s.d. of propane. The combined feed entered the reactor at 385° F. and 500 p.s.i.g. The effluent left the reactor at 445° F. and was depropanized to provide 1,020 b.p.s.d. of propane overhead, of which 295 b.p.s.d. was removed as product and 725 b.p.s.d. was recycled to the reactor. The depropanizer bottoms was further fractionated to provide 3,945 b.p.s.d. of benzene which was recycled to the reactor, 801 b.p.s.d. of cumene which was sent to product storage, and 53 b.p.s.d. of cumene bottoms (heavy alkylbenzene) which was sent to by-product storage. The cumene product had a purity in excess of 99.8 mole percent and had a Bromine Index of 62.

EXAMPLE IV

The cumene unit was modified to provide for entry of the charge at the bottom of the reactor and withdrawal of effluent from the top of the reactor. The fixed bed reactor contained the same catalyst loading of 98,400 lbs. of solid phosphoric acid catalyst distributed in five beds, but was now charged in an upflow manner. The combined feed consisted of 530 b.p.s.d. of fresh benzene, 4,058 b.p.s.d. of benzene recycled from the fractionation section of the unit in order to maintain the desired molar excess of benzene in the reaction zone, and 533 b.p.s.d. of liquified propylene-propane fresh feed. The propylene-propane fresh feed was 94.8 mole percent propylene and comprised 503 b.p.s.d. of propylene and 30 b.p.s.d. of propane. The total combined feed entered the reactor at 380° F. and 500 p.s.i.g. at the rate of 5,121 b.p.s.d. The effluent left the reactor at 441° F. and was sent to the depropanizer fractionation column wherein 30 b.p.s.d. of propane product was produced. The resulting depropanizer bottoms was sent to the benzene fractionation column wherein 4,058 b.p.s.d. of benzene was removed overhead and returned to the reactor as the recycle benzene stream. The benzene column bottoms was sent to the cumene fractionation column wherein 796 b.p.s.d. of cumene product was produced overhead and sent to product storage while 50 b.p.s.d. of cumene bottoms product (heavy alkylbenzenes) was removed to by-product storage. The cumene product had a Bromine Index of 350 and a cumene purity in excess of 99.8 mole percent.

EXAMPLE V

The cumene unit was charged upflow at the rate of 5,475 b.p.s.d. of combined feed. The benzene charge was 4,444 b.p.s.d. comprising 522 b.p.s.d. of fresh benzene feed and 3,922 b.p.s.d. of benzene recycle. The propylene-propane feed was 50.2 mole percent propylene and comprised 498 b.p.s.d. of propylene and 533 b.p.s.d. of propane. The combined feed entered the reactor at 385° F. and 500 p.s.i.g. and the effluent left the reactor at 445° F. The effluent was fractionated to provide 533 b.p.s.d. of propane product, 3,922 b.p.s.d. of benzene which was recycled to the reactor, 790 b.p.s.d. of cumene product and 40 b.p.s.d. of cumene column bottoms (heavy alkylbenzene by-product). The cumene product had a purity in excess of 99.8 mole percent and a Bromine Index of 58.

EXAMPLE VI

The cumene unit was charged upflow at the rate of 5,960 b.p.s.d. of combined feed. The benzene charge was comprised of 524 b.p.s.d. of fresh benzene and 3,906 b.p.s.d. of recycle benzene. The liquid propylene-propane feed contained 34.8 mole percent of propylene and comprised 798 b.p.s.d. of propylene-propane fresh feed and 732 b.p.s.d. of propane which was recycled from the depropanizer column in order to reduce the concentration of propylene. The propylene-propane fresh feed comprised 506 b.p.s.d. of propylene and 292 b.p.s.d. of propane. The combined feed entered the reactor at 386° F. and 500 p.s.i.g. The effluent left the reactor at 446° F. and was depropanized to provide 1,024 b.p.s.d. of propane overhead, of which 292 b.p.s.d. was removed as product and 732 b.p.s.d. was recycled to the reactor. The depropanizer bottoms was further fractionated to provide 3,906 b.p.s.d. of benzene which was recycled to the reactor, 803 b.p.s.d. of cumene which was sent to product storage, and 32 b.p.s.d. of cumene bottoms (heavy alkylbenzenes) which was sent to by-product storage. The cumene product had a purity in excess of 99.8 mole percent and had a Bromine Index of 40.

EXAMPLE VII

The operation defined in Example VI above was continued, but the through-put of the unit was increased until the fractionation section had reached the limit of its capacity. At this point of stable operation at maximum through-put, the cumene unit was being charged upflow at the rate of 7,715 b.p.s.d. of combined feed. The benzene charge was comprised of 689 b.p.s.d. of fresh benzene and 5,061 b.p.s.d. of recycle benzene. The liquid propylene-propane feed contained 35.1 mole percent of propylene and comprised 1,035 b.p.s.d. of propylene-propane fresh feed and 930 b.p.s.d. of propylene which was recycled from the depropanizer column. The propylene-propane fresh feed comprised 657 b.p.s.d. of propylene and 378 b.p.s.d. of propane. The combined feed entered the reactor at 387° F. and 500 p.s.i.g. The effluent left the reactor at 447° F. and was depropanized to provide 1,308 b.p.s.d. of propane overhead, of which 378 b.p.s.d. was removed as product and 930 b.p.s.d. was recycled to the reactor. The depropanizer bottoms was fractionated to provide 5,061 b.p.s.d. of benzene recycle, 1,060 b.p.s.d. of cumene which was sent to product storage, and 42 b.p.s.d. of cumene bottoms (heavy alkylbenzene) which was sent to by-product storage. The cumene product had a purity in excess of 99.8 mole percent and had a Bromine Index of 60.

DISCUSSION OF CUMENE OPERATION

The data of the above examples are condensed and summarized in Table I wherein flow rates are converted to pound moles per hour and other significant calculations are reported. It will be noted that the operation during the test periods summarized in the examples was relatively constant. The reactor was held at a pressure of 500 pounds per square inch (gauge) and at a reactor inlet temperature of about 385° F., while the benzene to propylene mole ratio was held constant at about 8 to 1. The liquid hourly space velocity on the combined feed was in the range of from 0.67 to 0.77 during the first six examples and the space velocity of propylene across the catalyst bed was in the range of from 0.060 to 0.067 during the first six test periods.

TABLE I.—COMMERCIAL CUMENE SYNTHESIS

Descriptive summary of example

| | Standard downflow | | | | | | New Upflow | | | | | | | |
|---|---|---|---|---|---|---|---|---|---|---|---|---|---|---|
| | Ex. No. I | | Ex. No. II | | Ex. No. III | | Ex. No. IV | | Ex. No. V | | Ex. No. VI | | Ex. No. VII | |
| | B.p.s.d. | Mol/hr. | B.p.s.d. | Mol/hr. | B.p.s.d. | Mol/hr. | B.p.s.d. | Mol/hr. | B.p.s.d. | Mol/hr. | B.p.s.d. | Mol/hr. | B.p.s.d. | Mol/hr. |
| Combined feed | 5,214 | | 5,474 | | 6,011 | | 5,121 | | 5,475 | | 5,960 | | 7,715 | |
| Propylene-propane feed | 548 | | 1,054 | | 806 | 142.0 | 533 | 96.0 | 1,031 | 179.6 | 798 | 140.5 | 1,035 | 182.3 |
| Propylene | 518 | 98.8 | 509 | 92.2 | 511 | 92.5 | 503 | 91.0 | 498 | 90.1 | 506 | 91.5 | 657 | 118.8 |
| Propane | 30 | 5.1 | 545 | 91.5 | 295 | 49.5 | 30 | 5.0 | 533 | 89.5 | 292 | 49 | 378 | 63.5 |
| Mole percent propylene | 94.9 | | 50.1 | | 64.8 | | 94.8 | | 50.2 | | 64.8 | | 64.8 | |
| Propane recycle | | | | | 725 | 121.5 | | | | | 732 | 122.5 | 930 | 156.0 |
| Total propylene-propane to reactor | 548 | 98.8 | 1,054 | 183.7 | 1,531 | 263.5 | 533 | 96.0 | 1,031 | 179.6 | 1,530 | 263.0 | 1,965 | 338.3 |
| Propylene | 518 | 93.7 | 509 | 92.2 | 511 | 92.5 | 503 | 91.0 | 498 | 90.1 | 506 | 91.5 | 657 | 118.8 |
| Propane | 30 | 5.1 | 545 | 91.5 | 1,020 | 171.0 | 30 | 5.0 | 533 | 89.5 | 1,024 | 171.5 | 1,308 | 219.9 |
| Mole percent propylene | 94.9 | | 50.1 | | 35.2 | | 94.8 | | 50.2 | | 34.8 | | 35.1 | |
| Propylene to propane mole ratio | 18.3:1.0 | | 1.01:1.0 | | 1.00:1.85 | | 18.2:1.0 | | 1.01:1.0 | | 1.00:1.88 | | 1.00:1.85 | |
| Total benzene | 4,666 | 771.1 | 4,420 | 730.4 | 4,480 | 740.2 | 4,588 | 758.1 | 4,444 | 734.2 | 4,430 | 731.9 | 5,750 | 949.5 |
| Fresh benzene | 545 | 90.1 | 529 | 87.4 | 535 | 88.2 | 530 | 87.6 | 522 | 86.2 | 524 | 86.9 | 689 | 114.5 |
| Recycle benzene | 4,121 | 681 | 3,891 | 643 | 3,945 | 652 | 4,058 | 670.5 | 3,922 | 648 | 3,906 | 645 | 5,061 | 835 |
| Benzene to propylene mole ratio | 8.23:1.0 | | 7.93:1.0 | | 8.02:1.0 | | 8.33:1.0 | | 8.14:1.0 | | 8.00:1.0 | | 7.99:1.0 | |
| Product flow rates: | | | | | | | | | | | | | | |
| Propane product | 30 | 5.1 | 545 | 91.5 | 295 | 49.5 | 30 | 5.0 | 533 | 89.5 | 292 | 49 | 378 | 63.5 |
| Cumene bottoms product | 51 | 4.0 | 62 | 4.1 | 53 | 4.2 | 50 | 3.9 | 40 | 3.1 | 32 | 2.5 | 42 | 3.3 |
| Cumene product | 819 | 86.1 | 792 | 83.3 | 801 | 84.1 | 796 | 83.7 | 790 | 83.1 | 803 | 84.6 | 1,060 | 111.2 |
| (Bromine Index of cumene product) | (390) | | (84) | | (62) | | (350) | | (58) | | (40) | | (60) | |
| Moles of bottoms per mole benzene consumed | 0.0444 | | 0.0470 | | 0.0476 | | 0.0445 | | 0.0360 | | 0.0298 | | 0.0297 | |
| Moles of bottoms per mole $C_3^=$ consumed | 0.0427 | | 0.0445 | | 0.0454 | | 0.0429 | | 0.0344 | | 0.0273 | | 0.0278 | |
| Moles of benzene consumed per mole cumene | 1.047 | | 1.048 | | 1.048 | | 1.047 | | 1.036 | | 1.029 | | 1.030 | |
| Moles of $C_3^=$ consumed per mole cumene | 1.098 | | 1.106 | | 1.099 | | 1.087 | | 1.083 | | 1.081 | | 1.068 | |
| Pressure, p.s.i.g. | 500 | | 500 | | 500 | | 500 | | 500 | | 500 | | 500 | |
| Reactor inlet temperature, °F | 382 | | 385 | | 385 | | 380 | | 385 | | 386 | | 387 | |
| Reactor outlet temperature, °F | 442 | | 444 | | 446 | | 441 | | 445 | | 446 | | 447 | |
| LHSV on total combined feed | 0.674 | | 0.706 | | 0.777 | | 0.661 | | 0.706 | | 0.770 | | 0.995 | |
| LHSV on liquid propylene | 0.0669 | | 0.0606 | | 0.0610 | | 0.0659 | | 0.0644 | | 0.0654 | | 0.0849 | |

Examples I through III were downflow operation in the standard prior art manner. It must be noted that the use of decreasing concentration of propylene in the propylene-propane feed had no beneficial influence on the production of heavy alkylbenzene as exemplified by the rate of cumene bottoms production. A decrease in the Bromine Index of the cumene product shows that the olefin content of the cumene was reduced by decreasing the concentration of propylene in the propane-propylene mixture. But this reduction was not due to any decrease in the oligomerization of propylene to form the olefinic contaminants. This reduction was caused by increased alkylation of benzene with the olefin contaminants as is indicated, by the corresponding increase in the amount of heavy alkylbenzene produced. Thus at a propylene purity of 94.9 mole percent the cumene bottoms by-product was 51 b.p.s.d. while at a propylene purity of 35.2 mole percent the cumene bottoms was 53 b.p.s.d. This amounted to an increase of from 0.0427 moles of bottoms per mole of propylene feed to 0.0454 moles of bottoms per mole of propylene, while the consumption of propylene in moles per mole of cumene remained constant at 1.098 to 1.099.

Examples IV, V, and VI were upflow in the manner of the present invention. It will be seen from the data that as the concentration of propylene in the propylene-propane feed mixture was decreased, not only was there the anticipated decrease in the Bromine Index of the cumene product, but there was also a pronounced decrease in the amount of alkylbenzene by-product produced (cumene bottoms product). Thus at 94.8% propylene purity the production of bottoms by-product was 0.0429 moles per mole of propylene, but at 34.8% propylene purity the bottoms rate was only 0.0273 moles per mole of propylene. This is contrary to what was experienced in the standard downflow operating examples as noted above, and indicates that there was an actual decrease in the rate of oligomerization of propylene to form olefinic contaminants. This is substantiated by the raw material consumption figures which are presented in the table. The data indicates that when synthesizing cumene in the upflow manner of the present invention there was a substantial reduction in the consumption of both propylene and benzene per mole of cumene product as the concentration of propylene in the propylene-propane feed was decreased. When synthesizing cumene in the prior art downflow manner there was no decrease in raw material consumption regardless of the propylene concentration in the propylene-propane feed.

A comparison of Examples III, VI, and VII indicates that the operation in the upflow manner of the inventive process not only resulted in a beneficial decrease of heavy alkylaromatic by-product production but that it also afforded an opportunity for increasing the capacity of the existing cumene unit without incurring capital expenditures. It will be seen that operation during Examples III and VI were conducted at a liquid hourly space velocity on the combined feed of about 0.77 whereas Example VII was conducted at a liquid hourly space velocity on combined feed of about 1.0. The increased throughput in Example VII resulted in an increased capacity for the unit of about 32% per day with no detrimental effect. Although the increased through-put of Example VII increased the amount of alkylbenzene by-product production (cumene bottoms product) on a barrel per stream day basis above that of Example VI, it remained below Example III and did not, in fact, cause an increase in the amount of by-product production on a mole per mole means of comparison. The actual raw material consumption of benzene and propylene per mole of product cumene remained below the prior art downflow values with no increase due to increased through-put.

A comparison of the downflow data with the upflow data indicates a further benefit in that the cumene product derived by the inventive upflow process was of a consistently higher purity as indicated by reduced Bromine Index at a given propylene concentration in the propylene-propane feed. Thus, a comparison of Examples I and IV indicates that the Bromine Index was reduced from 390 to 350 when the propylene-propane was about 95% propylene, while Examples III and VI show that the Bromine Index was reduced from 62 to 40 at a propylene concentration of about 35%.

It must be noted that the reactor vessel under prior art downflow operation is substantially vapor full while the reactor vessel under upflow operation is basically liquid full. The downflow reactor vessel contains an atmosphere of predominantly propane vapor with liquid benzene channeling down through the fixed catalyst beds. The upflow reactor vessel is primarily full of liquid benzene with streams of propane and propylene bubbling up through the liquid full fixed catalyst beds.

In light of the operational data, it is believed that the effectiveness of the upflow process is not only due to the substantially liquid full reactor of the inventive upflow process, but that there is also a definite need for a substantial concentration of propane in the propylene-propane feed. The data indicates that at about 95% propylene concentration there is no reduction in cumene bottoms production or in raw material consumption (Examples I and IV) upon changing operation from downflow to upflow. Upon reduction to about 50% propylene there is a significant reduction in cumene bottoms production and raw material consumption in operating upflow as compared to downflow (Examples II and V). This benefit is even more pronounced at the 35% propylene concentration (Examples III, IV, and VII). On the basis of these and other data, it was concluded that the present invention will yield substantial benefits if the propylene concentration is not greater than about 67%.

It is believed that the propane vapor acts as a dispersant in the fixed catalyst bed and provides for increased contacting of vapor and liquid. The propane acts to disperse the propylene more effectively through the catalyst bed so that there is increased opportunity for the propylene to contact liquid and alkylate the benzene. There is thus a reduced tendency for the propylene to oligomerize to heavier olefins and thereby produce heavy alkylbenzene by-product (cumene bottoms). The net effect thus is to reduce raw material consumption per mole of cumene product. In addition, whatever heavier olefins are produced by oligomerization of propylene are more effectively dispersed through the liquid in the catalyst bed so that there is increased opportunity for the heavy olefinic by-product to alkylate with benzene. The net effect is thus to reduce the Bromine Index of the final cumene product. Because the propylene is more effectively dispersed through benzene liquid, there is also a reduction in the tendency of the propylene to polyalkylate the benzene. Since there is less di-isopropyl benzene produced, this effect also contributes to the reduction in the amount of cumene bottoms by-product and to the reduction in raw material consumption.

Since the propane diluent in the propylene-propane feed is required as a dispersant, it may be seen that any vapor dispersant which is chemically inert under the reaction conditions would be equally effective. Methane, ethane, and nitrogen are some of the inert vapors that could also be utilized as unreactive vapor dispersant within the scope of the inventive process.

DISCUSSION OF ETHYLBENZENE OPERATION

In order to further illustrate the particular effectiveness of the present invention as applied to cumene synthesis, Table II is presented hereinbelow. This table of data was derived from operations on a commercial ethylbenzene unit which had been in operation for many years with a standard fixed bed downflow reaction system containing a solid phosphoric acid catalyst distributed in five beds.

This commercial operating unit, at a foreign location, was experiencing severe fouling problems in the fractionator reboilers. The commercial unit produced ethylbenzene from two feed stocks having nominal purities of 100% ethylene and 67% ethylene, and reboiler fouling was experienced with both feed stocks. The fouling of these fractionator reboilers was due to the accumulation of tarry resinous materials which were produced in the reaction zone by the oligomerization of ethylene to high boiling resinous polymers.

In view of the improved results which had been obtained by the practice of the inventive upflow cumene process as disclosed hereinabove, the ethylbenzene unit was converted to an upflow operation. It was anticipated that upflow operation in the manner disclosed hereinabove, would reduce the tar formation in the ethylbenzene unit. Since upflow operation in the inventive cumene process had led to the discovery that propylene oligomerization was substantially reduced, it was anticipated that oligomerization of ethylene would also be reduced.

TABLE II.—COMMERCIAL ETHYLBENZENE SYNTHESIS

| | Downflow | | Upflow | |
|---|---|---|---|---|
| Column Number | I | II | III | IV |
| Ethylene-ethane feed: | | | | |
| Mole percent ethylene | 100 [1] | 68.5 | 67.5 | 100 [1] |
| Mole ratio of ethylene to ethane | | 2.17 | 2.08 | |
| Benzene to ethylene mole ratio | 11.1 | 11.5 | 12.3 | 11.6 |
| Operating conditions: | | | | |
| Pressure, kg./sq. cm | 60 | 60 | 60 | 60 |
| Reactor inlet temperature, °C | 263 | 254 | 255 | 257 |
| Reactor outlet temperature, °C | 288 | 282 | 283 | 285 |
| LHSV on total combined feed | 0.94 | 0.91 | 0.94 | 0.94 |
| Ethylene Conversion: | | | | |
| Percent ethylene conversion | 99.9 | 97.5 | 90.5 | 96.5 |
| Percent ethylene unreacted | 0.1 | 2.5 | 9.5 | 3.5 |
| Ethylbenzene product, metric tons/day | 72.47 | 56.70 | 58.78 | 66.73 |

[1] Nominal 100%. Analysis unavailable.

The data presented in Table II clearly demonstrates that the superior advantages of the inventive upflow cumene process are not to be found when the inventive process is applied to an ethylbenzene synthesis unit. Columns I and II of the table above, set forth a summary of the downflow operation wherein excellent conversions of ethylene to ethylbenzene products were experienced on both feed stocks, although fractionator reboiler fouling was experienced due to oligomerization of ethylene within the reaction zone.

Columns III and IV indicate the results that were obtained by operating the commercial ethylbenzene unit in an upflow manner in an attempt to reproduce the advantages which had been discovered to be obtainable in cumene synthesis by the practice of the present invention. Column III discloses that the operation was first undertaken upflow with the lower purity olefin stock. This feedstock had a mole ratio of ethylene to unreactive vapor dispersant of about 2:1, and specifically of 2.08:1. This operation was initiated first in anticipation that the upper limitation which had been discovered in the synthess of cumene would also be applicable to the synthesis of ethylbenzene. It will be seen in Column III that while ethylene oligomerization probably was reduced, the overall operation was worse. Ethylene conversion was not improved and in fact was reduced from the high values of ethylene conversion obtained when operating downflow, to the relatively low value of 90.5% ethylene conversion when operated upflow. This loss of conversion was the result of the fact that no reaction was occurring in the first two catalyst beds (at the bottom of the reactor) as evidenced by the fact that no temperature rise was found across these catalyst beds.

Since poorer results were obtained with the upflow reaction system instead of the anticipated improved results, the operation was switched to the pure ethylene feedstock. This test result is indicated in Column IV of Table II, wherein it is seen that despite the fact that the increased ethylene purity increased the ethylene conversion, the resulting increase was not sufficient to equal what had previously been experienced in the standard prior art downflow operation in this commercial ethylbenzene unit. During this operation, the first two catalyst beds at the bottom of the reactor showed that improved reaction was occurring since a temperature rise was found across these beds.

A comparison of Columns I through IV clearly shows that downflow operation in the standard prior art manner was vastly superior to upflow operation in accordance with the process disclosed hereinabove. As pointed out in the discussion hereinabove, by the practice of the inventive upflow process for the synthesis of cumene, improved product yields and product purity were obtained as the propylene purity decreased and the ratio of propylene to unreactive vapor dispersant increased. In contrast to these benefits, the data presented in Table II show that not only did the upflow ethylbenzene reaction produce yields which decreased with decreasing ethylene purity and decreasing molar ratio of ethylene to unreactive vapor dispersant, but the ethylene reaction was consistently worse in product yields (as shown by ethylene conversion) than what was obtained by operation in the standard downflow manner.

While the discovery that the present invention was not applicable to ethylbenzene synthesis was a disappointment, it probably is not too surprising since those skilled in the art are well aware of the fact that catalytic systems are relatively unpredictable. However, it is believed that the failure of the present invention to produce processing benefits in the synthesis of ethylbenzene stems from the chemical characteristics of ethylene. It is well known to those skilled in the art that ethylene is relatively less active not only in aromatic alkylation, but also in polymerization and other catalytic reaction systems. That is to say, ethylene is relatively less active or less reactive in comparison to other normally gaseous olefins of higher molecular weight.

PREFERRED EMBODIMENTS

Although the process of this invention has been thus found to be detrimental to ethylbenzene synthesis, since it has been found particularly beneficial in the synthesis of cumene it will have equal application in other similar processing wherein the olefin is more reactive than ethylene. Thus, since propylene is more reactive than ethylene, and since isobutylene is even more reactive than propylene, it is believed that the inventive process will be found to produce substantial processing improvements in any aromatic alkylation process utilizing propylene or isobutylene.

For example, the synthesis of p-cymene may be undertaken by alkylation of toluene with propylene. The system is similar to the inventive cumene process in that propylene will oligomerize to produce contaminating heavy olelns. The product p-cymene may then be oxidized to produce paracresol and the olefinic contamination will interfere with the cresol production in a manner similar to that disclosed hereinabove for phenol synthesis by cumene oxidation. Therefore, it may be seen that the subject invention will be equally effective in eliminating or minimizing this problem, since by the practice of the inventive process the oligomerization of propylene is minimized.

A further application of the inventive process may be found in the synthesis of butylated parahydroxyanisole. It is the art to produce butylated parahydroxyanisole by charging liquid parahydroxyanisole downflow through a bed of silica-alumina catalyst in the presence of either tertiary butyl alcohol or isobutylene. While high purity butylated parahydroxyanisole may be produced in this manner, there is a substantial loss of yield due to the production of di-isobutylene by-product. The inventive process will be effective in eliminating or minimizing the production of di-isobutylene by-product by charging the parahydroxyanisole and the tertiary butyl alcohol or isobutylene reactants upflow through the silica-alumina catalyst bed in the presence of an inert vapor dispersant. The dispersant would enable the tertiary butyl alcohol or isobutylene to come into more intimate contact with the parahydroxyanisole and thereby minimize the oligomerization of the olefin-acting compound and thus minimize production of di-isobutylene by-product.

The alkylation of the alkylatable aromatic compound with the olefin-acting compound within the practice of this invention may be undertaken in the reaction zone in the presence of any alkylation catalyst under suitable operating conditions. A particularly preferred catalyst which is utilized for the alkylation of aromatics within the practice of this invention is solid phosphoric acid catalyst which is a calcined composite of phosphoric acid and a siliceous absorbent. Another preferred catalyst utilized for the alkylation of aromatics within the inventive process comprises a complex of boron trifluoride with alumina. A further preferred catalyst comprises a composite of silica-alumina.

It is to be noted that the operating conditions as set forth in the examples and the tables are specific to the operations disclosed and are in no way to be construed as limiting upon the process. As previously noted, in the alkylation of aromatic compounds with an olefin-acting compound it is the art to provide a molar excess of the aromatic compound. This molar excess of alkylatable aromatic compound is maintained by holding the aromatic to olefin molar ratio in the range of from about 2:1 to about 30:1 with a preferred range of about 4:1 to about 16:1. This molar excess is required in order to minimize polyalkylation of the aromatic compound. When utilizing a solid phosphoric acid catalyst in the reaction zone it is a particularly preferred embodiment that the ratio of aromatic to olefin should be about 8:1 when synthesizing cumene.

In the synthesis of cumene by the inventive process, the temperature of the reaction zone may be from 300° F. to about 600° F. and when utilizing a solid phosphoric acid catalyst will normally range from 350° F. to 450° F. Conditions of temperature and pressure should be sufficient to substantially maintain benzene in the liquid state, in order that the fixed catalyst beds may remain substantially immersed in liquid with vapor dispersant bubbling up through the beds. The pressure of the alkylation reaction may be from 300 pounds per square inch (gauge) to 1000 pounds per square inch or even higher, provided that the vapor dispersant is not condensed to a liquid due to the pressure.

The liquid hourly space velocity of the combined feed in the reaction zone may range from about 0.5 to 5.0, but will normally be in the range of 0.5 to 1.5. In addition, it is to be noted that the temperature rise across the catalyst beds in the examples was maintained at about 60° F. However, the operating conditions of inlet temperature, space velocity, concentration of inert vapor dispersant, etc. may be adjusted to maintain any temperture rise as desired in order to hold the catalyst temperature at a point sufficient to maintain the olefin content of the cumene product at the desired low value while minimizing raw material consumption.

The specific reactor operating conditions which are required for alkylation of any aromatic hydrocarbon or other alkylatable aromatic compound when utilizing a solid phosphoric acid catalyst or any other catalyst are readily ascertainable by those skilled in the art.

From the data presented it will be seen that the effectiveness of the present invention is not only dependent upon passing the reactants upflow through the liquid full fixed catalyst beds, but that the presence of a substantial concentration of unreactive vapor dispersant is also critical and that this effectiveness is enhanced as the concentration of dispersant is increased. At a 95% concentration of propylene in the propylene-propane feed stream there was no significant benefit to be found in charging the reactor upflow. While the Bromine Index was reduced from 390 in the standard downflow operation to 350 under the upflow operation, this was accompanied by a slight increase in cumene bottoms by-product loss. At a 50% propylene concentration, however, the cumene product purity increased (Bromine Index decreased) while the cumene bottoms by-product loss was significantly reduced. At a 35% propylene concentration these benefits were more greately enhanced. It is believed that the effectiveness of substantial propane dispersant becomes pronounced enough to be of commercial significance when the concentration of propylene in the propylene-propane feed is about 67% and that the inventive upflow process should be applied to cumene synthesis under conditions sufficient to alkylate benzene with propylene with a propylene to propane dispersant ratio not greater than about 2:1. While the benefits of the inventive process could be further enhanced by decreasing the propylene concentration below about 35% it is not believed commercially advisable to do so. Such operation would require the fractionation and recycling of excessive quantities of propane, with the result that the increased operating expenses and increased capital expenditure for larger capacity equipment could not be justified by the resulting purity of product cumene or by the resulting reduction in cumene bottoms by-product loss.

From the foregoing discussion it may be summarized that a preferred embodiment of the present invention is a process for the production of cumene which comprises passing benzene and propylene in a molar ratio of benzene to propylene in the range of from about 4:1 to about 16:1, in an upflow manner through a substantially liquid full fixed bed reaction zone containing a solid phosphoric acid catalyst in the presence of an unreactive vapor dispersant, in a molar ratio of propylene to dispersant not gretaer than 2:1; reacting the propylene with benzene in the reaction zone under conditions sufficient to monoalkylate benzene with propylene while substantially maintaining benzene in a liquid state and dispersant in a vapor state; withdrawing from the reaction zone an effluent comprising benzene, unreactive vapor dispersant, and cumene; and, recovering high purity cumene from the effluent.

It may also be summarized that a preferred embodiment of the present invention is a process for the production of cumene which comprises: passing benzene and propylene in a molar ratio of benzene to propylene in the range of from about 4:1 to 16:1, in an unflow manner through a substantiality liquid full fixed bed reaction zone containing a solid phosphoric acid catalyst in the presence of an unreactive vapor dispersant comprising propane; reacting the propylene with benzene in the reaction zone under conditions sufficient to monoalkylate benzene with propylene while substantially maintaining benzene in a liquid state and propane dispersant in a vapor state; passing an effluent stream comprising benzene, cumene, and propane dispersant from the reaction zone to a first separation zone maintained under conditions sufficient to provide a first fraction comprising propane and a second fraction comprising benzene and cumene; passing the second fraction from the first separation zone to a second separation zone maintained under conditions sufficient to provide a third fraction comprising benzene and a fourth fraction comprising cumene; passing at least a portion of the first fraction into the reaction zone, if required, in a manner sufficient to maintain the presence therein of the unreactive vapor dispersant; passing at least a portion of third fraction into the reaction zone in a manner sufficient to maintain the molar ratio of benzene to propylene; and, recovering high purity cumene from the fourth fraction.

It may be further noted that these preferred embodiments of the present invention as thus summarized, comprise a particularly preferred process for the production of cumene wherein benzene and propylene in a molar ratio of about 8:1 are passed upflow into a substantially liquid full fixed bed reaction zone containing a solid phosphoric acid catalyst under alkylating conditions in the presence of an unreactive vapor dispersant comprising propane, and the dispersant is maintained in the reaction zone in a molar ratio of propylene to dispersant not greater than about 2:1 and preferably at a ratio of about 1:2.

The invention claimed:
1. Process for the production of cumene which comprises:
  (a) passing benzene and propylene in a molar ratio of benzene to propylene in the range of from about 4:1 to about 16:1, in an upflow manner through a substantially liquid full fixed bed reaction zone containing a solid phosphoric acid catalyst in the presence of an unreactive vapor dispersant, in a molar ratio of propylene to dispersant not greater than about 2:1;
  (b) reacting said propylene with benzene in said reaction zone under conditions sufficient to monoalkylate benzene with propylene while substantially maintaining benzene in a liquid state and said dispersant in the vapor state, said conditions comprising a temperature of from about 300° F. to about 600° F. and a pressure of from about 300 to about 1000 pounds per square inch gauge;
  (c) withdrawing from said reaction zone an effluent stream comprising benzene, cumene, and unreactive vapor dispersant; and,
  (d) recovering cumene from said effluent in high concentration.

2. Process of claim 1 wherein said dispersant is selected from the group consisting of methane, ethane, propane, and nitrogen.

3. Process of claim 2 wherein said dispersant is propane.

4. Process of claim 1 wherein said reaction zone conditions of Step (b) comprise a combined feed liquid hourly space velocity in the range of from about 0.5 to about 5.0.

5. Process of claim 4 wherein said combined feed liquid hourly space velocity is in the range of from about 0.5 to about 1.5, and said reaction zone is maintained at a temperature in the range of from about 350° F. to about 450° F.

6. Process of claim 5 wherein said benzene to propylene ratio is 8:1, said combined feed liquid hourly space velocity is in the range of from about 0.6 to about 1.0, and said reaction zone is maintained at a pressure of about 500 p.s.i.g.

7. Process of claim 1 wherein said unreactive vapor dispersant is recovered from said effluent stream, and at least a portion of said recovered dispersant is returned to said reaction zone in a manner sufficient to maintain said molar ratio of propylene to dispersant.

8. Process for the production of cumene which comprises:
  (a) passing benzene and propylene in a molar ratio of benzene to propylene in the range of from about 4:1 to about 16:1, in an upflow manner through a substantially liquid full sized bed reaction zone containing a solid phosphoric acid catalyst in the presence of an unreactive vapor dispersant comprising propane;

(b) reacting said propylene with benzene in said reaction zone under conditions sufficient to monoalkylate benzene with propylene while substantially maintaining benzene in a liquid state and said propane dispersant in a vapor state;

(c) passing an effluent stream comprising benzene, cumene, and propane dispersant from said reaction zone to a first separation zone maintained under conditions sufficient to provide a first fraction comprising propane and a second fraction comprising benzene and cumene;

(d) passing said second fraction from said first separation zone to a second separation zone maintained under conditions sufficient to provide a third fraction comprising benzene and a fourth fraction comprising cumene;

(e) passing at least a portion of said first fraction into said reaction zone in a manner sufficient to maintain the presence therein of said unreactive vapor dispersant;

(f) passing at least a portion of said third fraction into said reaction zone in a manner sufficient to maintain said molar ratio of benzene to propylene; and, (g) recovering high purity cumene from said fourth fraction.

9. Process of claim 8 wherein said reaction zone contains a plurality of fixed catalyst beds comprising a solid phosphoric acid catalyst.

10. Process of claim 8 wherein said portion of said first fraction is passed into said reaction zone in a manner sufficient to maintain the molar ratio of propylene to unreactive vapor dispersant at a ratio not greater than about 2:1.

11. Process of claim 8 wherein said reaction zone conditions of Step (b) comprise a combined feed liquid hourly space velocity in the range of from about 0.5 to about 5.0, a temperature in the range of from about 300° F. to about 600° F., and a pressure in the range of from about 300 p.s.i.g. to about 1000 p.s.i.g.

12. Process of claim 11 wherein said combined feed liquid hourly space velocity is in the range of from about 0.5 to about 1.5, and said reaction zone is maintained at a temperature in the range of from about 350° F. to about 450° F.

13. Process of claim 12 wherein said benzene to propylene ratio is 8:1, said combined feed liquid hourly space velocity is in the range of from about 0.6 to about 1.0, and said reaction zone is maintained at a pressure of about 500 p.s.i.g.

References Cited

UNITED STATES PATENTS

| | | | |
|---|---|---|---|
| 3,293,315 | 12/1966 | Nixon | 260—671 |
| 3,381,049 | 4/1968 | Alexander et al. | 260—671 |

DELBERT E. GANTZ, Primary Examiner

C. R. DAVIS, Assistant Examiner